Patented Jan. 6, 1953

2,624,765

UNITED STATES PATENT OFFICE 2,624,765

PROCESS FOR PREPARING PROPARGYL ALDEHYDE DIMETHYL ACETAL

Frederick Fahnoe, Easton, Pa., assignor to General Aniline & Film Corporation, New York, N. Y., a corporation of Delaware No Drawing. Application June 4, 1949,
Serial No. 97,313

3 Claims. (Cl. 260—615)

This invention relates to a new composition of matter and to a method for preparing it.

In the synthesis of butynediol, which is described generally in U. S. Patent 2,232,867, formaldehyde and acetylene are reacted in a tube containing a copper acetylide catalyst and the products subjected to a batch distillation to remove products boiling at and below 97° C. This overhead primarily is propargyl alcohol which forms a binary azeotrope with water. As described in U. S. patent application, Serial No. 67,981, filed December 29, 1948, now Patent Number 2,527,358, dated October 24, 1950, of which the present case is a continuation-in-part, this propargyl alcohol-water azeotrope is treated with acidified methanol and the material distilled to remove the purified propargyl alcohol-water azeotrope to further separation steps. One of the other reaction products of the acidified methanol treatment step is a composition which is the subject of the present application.

It is an object of the present invention to provide a new composition of matter.

It is a further object of the present invention to provide a process for the preparation of a new composition of matter.

It is a further object of the present invention to provide a process for the preparation of a new composition of matter whereby the said composition is obtained from a by product of the butynediol process which because of its difficulty of separation from propargyl alcohol would otherwise become an impurity in the propargyl alcohol.

The present invention relates to a new composition of matter, propargyl aldehyde dimethyl acetal, having the following formula:

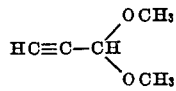

The process for preparing this composition comprises heating together propargyl aldehyde and methanol. The methanol is preferably acidified. The preferred process, however, involves the reaction of acidified methanol with propargyl aldehyde which occurs as an impurity in propargyl alcohol obtained in the butynediol synthesis.

The preferred process for producing this compound comprises treating the butynediol synthesis product boiling below 97° C. which contains propargyl aldehyde with an acidified methanol and removing by distillation the product boiling in the range 80–95° C., which is substantially propargyl aldehyde dimethyl acetal.

The invention may be more fully understood by reference to the example which sets forth a preferred embodiment of the invention.

Example

Aqueous formaldehyde and acetylene are passed through a tube containing a copper acetylide catalyst at a temperature in the range 100–120° C. at a pressure of about 100 p. s. i. This butynediol synthesis product is batch distilled to remove as overhead products boiling below 97° C. These reaction products containing primarily propargyl alcohol-water azeotrope and some propargyl aldehyde are acidified with hydrochloric acid and diluted with 10% by weight of methanol. This product is fractionated yielding three overhead fractions in which the first fraction boiling at about 42° C. is methanol methylal azeotrope, the second fraction boiling at about 65° C. is methanol, the third fraction boiling in the range 88–95° C. is propargyl aldehyde dimethyl acetal, and the fraction boiling above 97° C. is a propargyl alcohol-water azeotrope. The fraction boiling in the range 88–95° C. is saturated with common salt and the product distilled and collected as a two-phase ternary azeotrope containing propargyl aldehyde dimethyl acetal 84.6%, water 13.3%, and the propargyl alcohol 2.2% (distilling at 88° C.). The top layer is recovered and redistilled and the fraction distilling at 111° C. is propargyl aldehyde dimethyl acetal. The product was a water-white liquid having a boiling point at 112° C. at 760 mm. and a refractive index of n 25/D of 1.4085 and had the following analysis:

| | Calculated | Found |
|---|---|---|
| C | 59.1 | 60.0 |
| H | 8.5 | 8.0 |

While hydrochloric acid is used in the above example, it will be understood that other acids may be used such as other strong mineral acids. The amount of acid may be varied but any amount required to make the reaction mixture acid may be used and this amount is preferably about 1% based on the reaction mixture.

Propargyl aldehyde dimethyl acetal is useful as a stabilized form of propargyl aldehyde. The new composition is also useful as a chemical intermediate.

I claim:

1. A process for preparing propargyl aldehyde dimethyl acetal which comprises treating butynediol synthesis product boiling below 97° C. and containing propargyl alcohol, water, and propargyl aldehyde with acidified methanol and fractionally distilling to remove the product boiling in the range 80–95° C.

2. A process for producing propargyl aldehyde dimethyl acetal which comprises treating a butynediol synthesis product boiling below 97° C. and containing propargyl alcohol, water, and propargyl aldehyde with about 10% of methanol based on said product and about 1% of a strong mineral acid, and fractionally distilling the reaction mixture to remove the product boiling in the range 80–95° C.

3. A process for preparing propargyl aldehyde dimethyl acetal, which comprises fractionating a mixture of a butynediol synthesis product boiling below 97° C. and containing propargyl alcohol, water and propargyl aldehyde with acidified methanol, fractionally distilling to remove the product boiling in the range 80–95° C., saturating this product with salt, distilling, removing the top layer of the distillate formed thereby and fractionally distilling at 111° C. to remove the propargyl aldehyde dimethyl acetal.

FREDERICK FAHNOE.

REFERENCES CITED

The following references are of record in the file of this patent:

UNITED STATES PATENTS

| Number | Name | Date |
|---|---|---|
| 1,312,186 | King et al. | Aug. 5, 1919 |
| 1,850,836 | Guinot | Mar. 22, 1932 |
| 2,412,814 | Kendall et al. | Dec. 17, 1946 |
| 2,508,257 | Hearne et al. | May 16, 1950 |

OTHER REFERENCES

Johnson, Acetylenic Compounds, vol. 1 (1946), Edward Arnold and Co., London, page 39.